(12) United States Patent
Kobayashi et al.

(10) Patent No.: US 6,506,518 B1
(45) Date of Patent: Jan. 14, 2003

(54) LITHIUM SECONDARY BATTERY

(75) Inventors: Koutaro Kobayashi, Okayama (JP); Yoshimasa Koishikawa, Honjou (JP); Kensuke Hironaka, Fukaya (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/525,264

(22) Filed: Mar. 14, 2000

(30) Foreign Application Priority Data

Apr. 27, 1999 (JP) ............................................. 11-118961
Nov. 15, 1999 (JP) ............................................. 11-323502

(51) Int. Cl.$^7$ ......................... H01M 4/58; H01M 4/74; H01M 6/00
(52) U.S. Cl. ............................... 429/231.1; 429/231.8; 429/244; 29/623.1; 29/623.5
(58) Field of Search .......................... 429/231.1, 231.4, 429/231.8, 218, 218.1, 244; 29/623.1–623.5

(56) References Cited

U.S. PATENT DOCUMENTS

| | | | | |
|---|---|---|---|---|
| 5,069,683 A | * | 12/1991 | Fong et al. ................. | 29/623.1 |
| 5,219,680 A | * | 6/1993 | Fauteux ....................... | 429/192 |
| 5,436,092 A | * | 7/1995 | Ohtsuka et al. ............. | 429/194 |
| 5,443,601 A | * | 8/1995 | Doeff et al. ................. | 29/623.5 |
| 5,571,638 A | * | 11/1996 | Satoh et al. ................. | 429/248 |
| 5,601,952 A | * | 2/1997 | Dsgupta et al. | |
| 5,629,112 A | | 5/1997 | Davidson et al. | |
| 5,656,394 A | * | 8/1997 | Koksbang et al. ........... | 429/218 |
| 5,773,167 A | * | 6/1998 | Iwasaki et al. ............. | 429/231.8 |
| 5,783,328 A | * | 7/1998 | Wang ........................... | 423/599 |
| 5,856,043 A | * | 1/1999 | Ohsaki et al. .............. | 429/218 |
| 5,907,899 A | * | 6/1999 | Dahn et al. ................. | 252/182.1 |
| 6,030,726 A | * | 2/2000 | Takeuchi et al. ......... | 429/231.8 |
| 6,053,953 A | * | 4/2000 | Tomiyama et al. ......... | 29/623.1 |
| 6,083,644 A | * | 7/2000 | Watanabe et al. ......... | 429/231.1 |
| 6,146,791 A | * | 11/2000 | Loutfy et al. ............ | 423/445 B |
| 6,156,457 A | * | 12/2000 | Takami et al. ............. | 429/231.4 |
| 6,218,050 B1 | * | 4/2001 | Yoon et al. ................. | 423/414 |
| 6,265,110 B1 | * | 7/2001 | Rao et al. ................. | 429/231.8 |
| 6,306,542 B1 | * | 10/2001 | Nakano et al. ............. | 429/224 |
| 6,316,146 B1 | * | 11/2001 | Watanabe et al. ........... | 252/502 |
| 6,334,993 B1 | * | 1/2002 | Suita et al. ................. | 423/599 |
| 2002/0055041 A1 | * | 5/2002 | Kobayashi et al. ......... | 429/221 |

FOREIGN PATENT DOCUMENTS

| | | | |
|---|---|---|---|
| EP | 0 528 557 A1 | | 2/1993 |
| EP | 0 808 798 A2 | | 11/1997 |
| EP | 0 917 223 A1 | | 5/1999 |
| JP | 10321225 | | 4/1998 |
| JP | 11-185822 | | 7/1999 |
| JP | 11-214042 | | 8/1999 |
| WO | WO 98/28806 A | * | 7/1998 |
| WO | WO 98/28806 | * | 7/1998 ............... 429/231.8 |

* cited by examiner

*Primary Examiner*—Tom Dunn
*Assistant Examiner*—L. Edmondson
(74) *Attorney, Agent, or Firm*—Oliff & Berridge, PLC

(57) ABSTRACT

A lithium secondary battery capable of improving high temperature cycle life characteristic effectively without decreasing discharge capacity. Amorphous carbon powder with a specific surface area of 10.0 m$^2$/g and a mean particle diameter of 7.0 μm is used as negative electrode active material and lithium manganate with a Li/Mn ratio of 0.58 is used as positive electrode active material. Since a surface area of the negative electrode active material layer is made large by setting the mean particle diameter of the amorphous carbon powder to 10 μm or less, the surface area of the negative electrode active material layer is sufficiently large that, even when inert coating is formed on the surface of the negative electrode due to manganese deposition caused by manganese elution from the positive electrode, high temperature cycle life characteristic can be improved without high temperature deterioration.

4 Claims, No Drawings

LITHIUM SECONDARY BATTERY

BACKGROUND OF THE INVENTION

1. Field of the Invention

The present invention relates to a lithium secondary battery, and in particular relates to a lithium secondary battery using lithiummanganate as positive electrode active material and amorphous carbon material as negative electrode active material.

2. Description of the Related Art

Conventionally, in a field of a rechargeable secondary battery, an aqueous solution type battery such as a lead-acid battery, a nickel-cadmium battery, a nickel-hydrogen battery and the like was in a main trend. In recent years, however, in view of such problems as global warming and exhaustible fuel, attention has been paid to an electric vehicle (EV) and a hybrid electric vehicle (HEV) whose driving force is assisted with an electric motor, and a secondary battery with higher capacity and higher power (output) for such vehicles has been required. As a power source to meet such a need, a non-aqueous solution type lithium secondary battery which has high voltage has lately drawn attention.

Carbon material which lithium ions can be inserted in/departed from (occluded in/released from) is generally used as negative electrode material (negative electrode active material) for the lithium secondary battery. As such carbon material, for example, graphite system material such as natural graphite, scale-shaped or massive-shaped artificial graphite, mesophase pitch system; graphite or the like, or amorphous (noncrystalline) carbon material prepared by calcinating such furan resin as furfuryl alcohol or the like can be listed up. In the graphite system material, while there are advantages in that irreversible capacity is small, voltage characteristic is flat and capacity is high, but there is a disadvantage in that cycle characteristic is inferior. Also, in the amorphous carbon prepared by calcinating the synthetic resin, while there are advantages in that a capacity value exceeding a theoretical capacity value of the graphite can be obtained and the cycle characteristic is superior, but there are disadvantages in that the irreversible capacity is large and it is difficult to increase battery capacity.

Meanwhile, lithium transition metallic oxide is used as positive electrode material (positive electrode active material) for the lithium secondary battery. As the positive electrode material, lithium cobaltate is generally used in view of balances of capacity, cycle characteristic and the like. In a secondary battery using lithium cobaltate for the positive electrode material, since the quantity of cobalt resources as its raw material is small and the cobalt is costly, lithium manganate has been regarded as promising material for the EV or HEV battery, and the development has been advanced for the battery.

However, in the battery using the lithium manganate as the positive electrode material, since the lithium manganate causes elution at a high temperature of 50° C. or so, the battery is inferior to the battery using the lithium cobaltate for the positive electrode material in cycle characteristic under the high temperature. Thus, there is a drawback in a case in which the lithium manganate is assumed to be applied to the EV or HEV. In order to overcome the drawback, there have been various proposals that manganese site of the lithium manganate is replaced with dissimilar metal such as cobalt (Co), chromium (Cr) or the like so as to decrease the manganese elution even under the high temperature and to improve the high temperature characteristic of the battery.

In the lithium manganate whose manganese site is replaced with the dissimilar metal, the manganese elution amount at the high temperature is decreased definitely, but there are drawbacks in that the manganese elution into the electrolytic solution is not only prevented completely but also discharge capacity is decreased.

SUMMARY OF THE INVENTION

The present inventors have studied and analyzed the causes of the cycle deterioration at the high temperature in the battery using the lithium manganate as the positive electrode material and the amorphous carbon material as the negative electrode material. As a result, the inventors have found out that the cycle deterioration at the high temperature is caused by formation of inert coating on a surface of the negative electrode because of the manganese eluted from the positive electrode acting as cores of the inert coating.

In view of the above drawbacks and based upon the findings, a first object of the present invention is to provide a lithium secondary battery capable of improving cycle characteristic effectively without decreasing discharge capacity.

A second object of the invention is to provide a lithium secondary battery capable of improving charging/discharging cycle life and preservation life under a high temperature.

In order to achieve the first object, a first aspect of the present invention is a lithium secondary battery, comprising a positive electrode having a positive electrode collector to which mixture containing lithium manganate as positive electrode active material is applied; and a negative electrode having a negative electrode collector to which mixture containing amorphous carbon material as negative electrode active material is applied, wherein a mean particle diameter of the amorphous carbon material is 10 μm or less. In this aspect, since the mean particle diameter of the amorphous carbon material is made to be 10 μm or less, surface area of the amorphous carbon material becomes large. Therefore, even when the inert coating is formed on the surface of the negative electrode due to the manganese elution from the positive electrode/the manganese deposition on the negative electrode, as a total surface area of the amorphous carbon material is large, the high temperature cycle characteristic of the secondary battery can be improved without decreasing discharge capacity.

In this aspect, the specific surface area of the amorphous carbon material having the mean particle diameter of 10 μm is about 5 m$^2$/g, and when the specific surface area is less than 5 m$^2$/g, an effect of a surface area increase is hardly obtained. The specific surface area of the amorphous carbon material with the mean particle diameter of 3.5 μm is about 20 m$^2$/g, and when the specific surface area is 20 m$^2$/g or more, the specific surface area is made excessively large so that deterioration in other performances such as an irreversible capacity increase and the like occurs. Therefore, it is preferable that the mean particle diameter of the amorphous carbon material is in the range of 3.5 μm or more and 10 μm or less. Further, when a Li/Mn ratio in the lithium manganate is in a range of more than 0.5 and 0.6 or less, a manganese elution amount can be reduced without decreasing the discharge capacity extremely as compared with the reduction in a case of the stoichiometric composition (0.5).

In order to achieve the second object, a second aspect of the invention is a lithium secondary battery, comprising a positive electrode having a positive electrode collector to which mixture containing lithium manganate as positive electrode active material is applied; and a negative electrode having a negative electrode collector to which mixture containing amorphous carbon material as negative electrode active material is applied, wherein irreversible capacity of the amorphous carbon material is in a range of 5% or more and 25% or less of initial charge capacity, and a discharge capacity ratio (−/+ ratio) of the negative electrode to the positive electrode after the initial charge is in a range of 1.3 or more and 1.8 or less. In this aspect, since the depth of discharge in the positive electrode becomes small as much as the irreversible capacity of the negative electrode increases by making the amount of the negative electrode active material in the lithium secondary: battery excessive so as to make the discharge capacity ratio of the negative electrode to the positive electrode large, deterioration of the positive electrode can be suppressed. Since the utilization factor of the negative electrode also becomes small due to the excess in the negative electrode active material, deterioration of the negative electrode can be suppressed. When the −/+ ratio is less than 1.3, an effect obtained by increasing the ratio is small, and when the −/+ ratio exceeds 1.8, as the load of the positive electrode becomes large and the battery capacity is reduced in spite of increasing the ratio. Accordingly, it is necessary to set the −/+ ratio in the range of at least 1.3 and at most 1.8. According to the present invention, since the deterioration of the positive and negative electrodes can be suppressed, the charging/discharging cycle life and preservation life can be improved.

In this aspect, when a Li/Mn ratio in the lithium manganate is set to at least 0.55 and at most 0.6, the amount of manganese elution can be reduced without decreasing the battery capacity extremely as compared with the stoichiometric composition (0.5). Thus, the above range is desirable for improvement in discharge cycle life and preservation life even under the high temperature.

The present invention will become more obvious with reference to the following preferred embodiments.

DETAILED DESCRIPTION OF THE PREFERRED EMBODIMENTS (First Embodiment)

A first embodiment where the present invention is applied to a cylindrical lithium secondary battery for a vehicle will be explained hereinafter. First, manufacturing procedure of the cylindrical lithium secondary battery according to the present embodiment will be described in order of a negative electrode, a positive electrode and assembly of the battery.
<Negative Electrode>

90 weight parts of amorphous carbon powder serving as negative electrode active material having a mean particle diameter of 3.5 $\mu$m to 10 $\mu$m and a predetermined specific surface area described later is added with 10 weight parts of polyvinylidene fluoride (PVDF) as binder, and it is added and mixed with N-methylpyrrolidone as dispersion solvent to produce slurry. The slurry thus obtained is applied to both surfaces of a rolled copper foil with a thickness of 10 $\mu$m serving as a negative electrode collector and subsequently the rolled copper foil applied is dried. Thereafter, the negative electrode collector on which mixture layers containing the negative electrode active material are formed is pressed and then cut to obtain a negative electrode with a thickness of 70 $\mu$m.
<Positive Electrode>

100 weight parts of lithium manganate serving as positive electrode active material with a ratio of lithium to manganese (Li/Mn ratio) of more than 0.5 and at most 0.6 is added with 10 weight parts of scale-shaped graphite as electroconductive material and 5 weight parts of PVDF as binder, and it is added and mixed with N-methylpyrrolidone as dispersion solvent to produce slurry. The slurry thus obtained is applied to both surfaces of an aluminum foil serving as a positive electrode collector with a thickness of 20 $\mu$m and subsequently the aluminum foil applied is dried. Thereafter, the positive electrode collector on which mixture layers containing the positive electrode active material are formed is pressed and then cut to obtain a positive electrode with a thickness of 70 $\mu$m.
<Assembly of Battery>

The negative electrode and the positive electrode thus obtained are wound with two sheets of polyethylene-made separators each having a thickness of 25 $\mu$m through which lithium ions can pass and interposed therebetween to manufacture a winding group or winding body. After the winding group is inserted into a cylindrical battery container or can, a predetermined amount of electrolytic solution is poured into the battery container, and an upper opening portion of the battery container is caulked with a lid disposed inside the upper portion of the battery container so that a cylindrical lithium secondary battery is assembled. The electrolytic solution is prepared previously in the following manner. Lithium hexafluorophosphate (LiPF$_6$) is dissolved at 1 mole/liter into mixed solution of ethylene carbonate (EC) and dimethyl carbonate (DMC). The design capacity of the cylindrical lithium secondary battery is 4.0 Ah.

EXAMPLES

Next, batteries of examples manufactured by changing the mean particle diameter and specific surface area of the amorphous carbon powder, and the Li/Mn ratio of the lithium manganate in various manners will be explained. It should be noted that batteries: of controls (comparative examples) assembled for comparison with the batteries of the examples will also be described.

Example 1-1

As shown in the following Table 1, in Example 1-1, according to the above first embodiment, a cylindrical lithium secondary battery (hereinafter, referred to as a battery of Example 1-1) was assembled using amorphous carbon powder with a mean particle diameter of 7.0 $\mu$m and a specific surface area of 10.0 m$^2$/g and lithium manganate with Li/Mn ratio of 0.58.

TABLE 1

| | Negative Electrode | | |
| --- | --- | --- | --- |
| | Mean Particle Diameter ($\mu$m) | Specific Surface Area (m$^2$/g) | Positive Electrode Li/Mn Ratio |
| Example 1-1 | 7.0 | 10.0 | 0.58 |
| Example 1-2 | 2.0 | 25.0 | 0.58 |
| Example 1-3 | 3.5 | 20.0 | 0.58 |
| Example 1-4 | 10.0 | 5.0 | 0.58 |
| Example 1-5 | 7.0 | 10.0 | 0.55 |
| Example 1-6 | 7.0 | 10.0 | 0.60 |
| Example 1-7 | 7.0 | 10.0 | 0.50 |
| Example 1-8 | 7.0 | 10.0 | 0.62 |
| Control 1-1 | 15.0 | 3.0 | 0.50 (replaced) |
| Control 1-2 | 15.0 | 3.0 | 0.58 |

Example 1-2 to Example 1-4

As shown in Table 1, the negative electrodes of Example 1-2 to Example 1-4 were manufactured by changing the mean particle diameter and the specific surface area of the amorphous carbon powder in the range of 2.0 to 10.0 μm and in the range of 5.0 to 25.0 m²/g, respectively. The batteries (referred to as batteries of Examples 1-2 to 1-4) were assembled using the same positive electrode, separators and electrolytic solution as those of Example 1-1 except for the negative electrode.

Example 1-5 to Example 1-8

As shown in Table 1, the positive electrodes of Examples 1-5 to 1-8 were manufactured by changing the Li/Mn ratio of the lithium manganate in the range of 0.50 to 0.62. The batteries (referred to as batteries of Examples 1-5 to 1-8) were assembled using the same negative electrode, separators and electrolytic solution as those of Example 1-1 except for the positive electrode.

<Control 1-1>

As shown in Table 1, in Control (Comparative Example) 1-1, amorphous carbon powder (specific surface area: 3.0 m²/g) having a mean particle diameter of 15 μm and lithium manganate (Li/Mn ratio: 0.50) whose manganese site is partially replaced with Cr (replacement amount: 5%) were used. The battery (hereinafter, referred to as a battery of Control 1-1) was assembled using the same separators and electrolytic solution as those of Example 1-1 except for the negative and positive electrodes.

<Control 1-2>

As shown in Table 1, in Control 1-2, amorphous carbon powder (specific surface area: 3.0 m²/g) having a mean particle diameter of 15 μm was used. The battery (hereinafter, referred to as a battery of Control 1-2) was assembled using the same positive electrode, separators and electrolytic solution as those of Example 1-1 except for the amorphous carbon powder. (Test)

Next, a discharge capacity test and a high temperature cycle life test were carried out about the respective batteries of the Examples and Controls thus assembled.

In the discharge capacity test, after constant voltage constant current charge (upper limit voltage=4.1 V) at a 2 hour rate (1/2C) was performed for 5 hours, and discharge was performed at a 2 hour rate (1/2C) until final voltage=2.7 V.

In the high temperature cycle life test, observation was made under the condition that, after an initial capacity test was carried out and charging/discharging behavior became stable, under the atmosphere of 50° C., constant voltage constant current charge (upper limit=4.1 V) at a 1 hour rate (1C) was performed for 4 hours and then discharge was performed at a 1 hour rate (1C) until the depth of a is charge (DOD)=40% (24 minutes) Life of each battery was determined as the number of cycles that the battery capacity reached 80% of the initial capacity.

Test results in the discharge capacity test and the high temperature cycle life test are shown in the following Table 2.

TABLE 2

| | Test Results | |
|---|---|---|
| | Discharge Capacity (Ah) | High Temp. Cycle Life (Cycle) |
| Example 1-1 | 4.1 | 250 |
| Example 1-2 | 4.1 | 150 |
| Example 1-3 | 4.1 | 300 |
| Example 1-4 | 4.1 | 205 |

TABLE 2-continued

| | Test Results | |
|---|---|---|
| | Discharge Capacity (Ah) | High Temp. Cycle Life (Cycle) |
| Example 1-5 | 4.2 | 215 |
| Example 1-6 | 4.0 | 250 |
| Example 1-7 | 4.2 | 180 |
| Example 1-8 | 3.8 | 250 |
| Control 1-1 | 3.5 | 50 |
| Control 1-2 | 4.1 | 75 |

(Evaluation)

As shown in Tables 1 and 2, as the discharge capacity test results, all of the batteries of Examples 1-1 to 1-7 where the mean particle diameter of the amorphous carbon powder was 10 μm or less demonstrated excellent discharge capacity characteristic of 4.0 Ah or more. The battery of Example 1-8 where the Li/Mn ratio in the lithium manganate was as large as 0.62 was slightly reduced in the discharge capacity. Meanwhile, in the battery of Control 1-1, its discharge capacity was reduced by 10% or more. It is considered that the discharge capacity of the positive electrode became small and the discharge capacity of the battery was reduced due to using the lithium manganate whose manganese site was replaced with Cr. Therefore, it will be understood that the Li/Mn ratio of the lithium manganate is desirable to be 0.6 or less.

As the high temperature cycle life test results, all of the batteries of Examples 1-1 to 1-8 using the amorphous carbon powder with the mean particle diameter of 10 μm or less were greatly improved in the cycle life. However, the batteries of Controls 1-1 and 1-2 using the amorphous carbon powder with the mean particle diameter of 15 μm and with the specific surface area of 3.0 m²/g were poor in the high temperature cycle life characteristic because of 75 cycles or less. In the battery of Example 1-2 using the amorphous carbon powder with the specific surface area of 25 m²/g which was slightly larger than those of the other examples, since its specific surface area was too large, the reaction area with the electrolytic solution increased and deterioration of the negative electrode active material itself advanced so that the improvement in the high temperature cycle life was relatively small because of 150 cycles. Therefore, it will be understood that the mean particle diameter of the amorphous carbon powder should be in the range of 3.5 μm or more and 10 μm or less.

Further, as the high temperature cycle life test results, in the battery of Example 1-7, since the Li/Mn ratio in the lithium manganate was set to 0.5, the number of cycles was 180. Thus, in this battery, the improvement in the high temperature cycle characteristic was relatively small next to the battery of Example 1-2, as compared with the other examples where the number of cycles is more than 200. Taking the above-mentioned discharge capacity test results into consideration, it is preferable that the Li/Mn ratio in the lithium manganate is in the range of more than 0.5 and 0.60 or less.

(Second Embodiment)

Next, a second embodiment where the present invention is applied to a cylindrical lithium secondary battery for a vehicle will be described hereinafter. In this embodiment, the same components or elements as the first embodiment are denoted by the same names, and explanation thereof is omitted and only different portions will be explained.

<Negative Electrode>

As a negative electrode in this embodiment, amorphous carbon powder is used of which irreversible capacity is 5% to 25% of initial charge capacity.

<Positive Electrode>

For a positive electrode, lithium manganate with Li/Mn ratio of 0.55 to 0.60 was used, and in the same manner as the first embodiment slurry is produced with the mixture. The slurry obtained was applied to both surfaces of the aluminum foil (positive electrode collector) and subsequently dried. Thereafter, the positive electrode collector on which mixture layers were formed was pressed and then cut to obtain a positive electrode with a thickness of 90 μm. Further, in this embodiment, an application amount of the slurry on the positive electrode (thickness of the positive electrode mixture layer) was adjusted so that a discharge capacity ratio (hereinafter, referred to as −/+ ratio) of the negative electrode to the positive electrode after initial charge was set to 1.3 to 1.8.

Next, batteries of examples manufactured by variously changing the Li/Mn ratio of the lithium manganate and the −/+ ratio will be explained. Batteries of controls manufactured for comparison will also be explained.

Example 2-1

As shown in the following Table 3, in Example 2-1, according to the second embodiment, a cylindrical lithium secondary battery (hereinafter, referred to as a battery of Example 2-1) was assembled by using lithium manganate with Li/Mn ratio of 0.55, adjusting the application amount of slurry on the positive electrode collector to obtain −/+ ratio of 1.3, and using amorphous carbon powder where irreversible capacity was 20% of initial capacity.

TABLE 3

|  | −/+ Ratio | Li/Mn Ratio |
|---|---|---|
| Example 2-1 | 1.3 | 0.55 |
| Example 2-2 | 1.5 | 0.55 |
| Example 2-3 | 1.8 | 0.55 |
| Example 2-4 | 1.8 | 0.58 |
| Example 2-5 | 1.8 | 0.60 |
| Control 2-1 | 1.0 | 0.55 |
| Control 2-2 | 1.2 | 0.55 |
| Control 2-3 | 1.9 | 0.55 |
| Control 2-4 | 1.3 | 0.50 |

Examples 2-2 and 2-3

As shown in Table 3, in Example 2-2 a battery of which −/+ ratio was 1.5 was manufactured, and in Example 2-3 a battery of which −/+ ratio was 1.8 was manufactured. The batteries (hereinafter, referred to as batteries of Examples 2-2 and 2-3) were assembled in the same procedure as Example 2-1 by using the same positive electrode, negative electrode, separators and electrolytic solution as those in Example 2-1 except for the application amount of the positive electrode slurry.

Examples 2-4 and 2-5

As shown in Table 3, in Example 2-4 a battery was manufactured by using lithium manganate of which Li/Mn ratio was 0.58, and in Example 2-5 a battery was manufactured by using lithium manganate of which Li/Mn ratio was 0.60. The batteries (hereinafter, referred to as batteries of Examples 2-4 and 2-5) were assembled in the same procedure as Example 2-3 by using the same positive electrode, negative electrode, separators and electrolytic solution as those in Example 2-3 except for the Li/Mn ratio.

<Controls 2-1 to 2-3>

As shown in Table 3, batteries of Controls 2-1 to 2-3 were manufactured by using lithium manganate of which Li/Mn ratio was 0.55, and changing the application amount of the positive electrode slurry to set −/+ ratio to 1.0, 1.2 and 1.9, respectively. The batteries (hereinafter, referred to as batteries of Controls 2-1 to 2-3) were assembled in the same procedure as Example 2-1 by using the same positive electrode, negative electrode, separators and electrolytic solution as those in Example 2-1 except for the Li/Mn ratio and −/+ ratio.

<Control 2-4>

As shown in Table 3, in Control 2-4 a battery was manufactured by using lithium manganate of which Li/Mn ratio was 0.50. The battery (hereinafter, referred to as a battery of Control 2-4) was assembled in the same procedure as Example 2-1 by using the same positive electrode, negative electrode, separators and electrolytic solution as those in Example 2-1 except for the Li/Mn ratio.

(Test)

Next, regarding the respective batteries of Examples and Controls manufactured, their battery capacities (discharge capacities) were measured, and after measured, their high temperature cycle life tests were conducted.

In the measurement of the battery capacity, after an initial capacity stabilizing operation, under the atmosphere of 25° C., constant voltage constant current charge (upper limit voltage: 4.1V) at a 1 hour rate (1C) was performed for 4 hours, and then discharge capacity where the battery was discharged by constant current at a 1 hour rate (1C) down to 2.7 V was determined as the battery capacity.

In the high temperature cycle life test, the same test as the high temperature cycle life test shown in the first embodiment was implemented. That is, the observation was made under the condition that, under the atmosphere of 50° C., the constant voltage constant current charge (upper limit=4.1 V) at the 1 hour rate (1C) was performed for 4 hours and then discharge was performed at the 1 hour rate (1C) until the depth of discharge (DOD)=40% (24 minutes). The life of each battery was determined as the number of cycles that the battery capacity reached 80% of the initial capacity.

Test results of measuring the battery capacities (discharge capacities) and the high temperature cycle life tests are shown in the following Table 4.

TABLE 4

|  | Discharge Capacity (Ah) | High Temp. Cycle Life (Cycle) |
|---|---|---|
| Example 2-1 | 4.0 | 250 |
| Example 2-2 | 3.6 | 270 |
| Example 2-3 | 3.2 | 290 |
| Example 2-4 | 3.1 | 300 |
| Example 2-5 | 3.0 | 310 |
| Control 2-1 | 4.7 | 110 |
| Control 2-2 | 4.2 | 150 |
| Control 2-3 | 3.1 | 200 |
| Control 2-4 | 4.2 | 150 |

(Evaluation)

As shown in Tables 3 and 4, in each of the batteries of Examples 2-1 to 2-3 where the −/+ ratio was in the range of 1.3 to 1.8 and the lithium manganate with the Li/Mn ratio =0.55 was used, an excellent cycle life of 250 cycles or more was obtained even at the high temperature of 50° C. Also, in each of the batteries of Examples 2-4 and 2-5 where the −/+ ratio was 1.8 and the lithium manganate with the Li/Mn ratio=0.58 or 0.60 was used, excellent cycle life of 300 cycles or more was obtained.

Meanwhile, in each of the batteries of Controls 2-1 and 2-2, the battery capacity was large, but the cycle life was inferior to that of each battery of Examples. In the battery of Control 2-3, though the −/+ ratio was made large (−/+ ratio: 1.9), the cycle life was hardly improved and on the contrary the battery capacity became small. Also, in the battery of Control 2-4 using the lithium manganate with the Li/Mn ratio of 0.50, though the −/+ ratio was 1.3, the improvement in the cycle life could not be observed.

From the above results, in the case of each of Examples 2-1 to 2-5 where the −/+ ratio was in the range of at least 1.3 and at most 1.8, it was found that the battery capacity was slightly reduced but the cycle characteristic was largely improved. In this case, it was also found that it was preferable that the Li/Mn ratio in the positive electrode active material was in the range of 0.55 to 0.60.

Generally, as compared with the room temperature, the cycle life of the lithium secondary battery using the lithium manganate as the positive electrode active material is extremely shortened at the high temperature of 50° C. or so like the battery being mounted inside an engine room. However, in the lithium battery according to this embodiment, even when the battery is mounted inside: the EV or HEV engine room, sufficient cycle life can be secured, as demonstrated in the results of the high temperature cycle life test.

Incidentally, in the second embodiment, the examples have been shown that the −/+ ratio is changed in the range of 1.3 to 1.8 by changing the application amount of the mixture containing the positive electrode active material, but the −/+ratio may be set in the range of 1.3 to 1.8 by changing the application amount of the mixture containing the negative electrode active material.

Further, in this embodiment, though the same amorphous carbon as that in the first embodiment was used, the mean particle diameter and the specific surface area are not limited to the ranges specified in the first embodiment as the preferable ranges.

Furthermore, in the examples according to this embodiment, the amorphous carbon powder where the irreversible capacity was 20% of the initial capacity was used, but the same effects can be obtained even when ones where the irreversible capacity is in the range of 5% to 25% are used as the amorphous carbon powder.

In the above embodiments, as the electrolytic solution, the electrolytic solution where lithium hexafluorophosphate was dissolved in the mixed solution of ethylene carbonate and dimethyl carbonate at 1 mole/liter was used, but the electrolytic solution is not particularly limited to this one, and even when the electrolytic solution being used by ordinary is used, the same effects as in the above embodiments can be obtained. Namely, even when the electrolytic solution where ordinary lithium salt used as electrolyte is dissolved in organic solvent, the present invention is applicable to the batteries using such electrolytic solution, and the lithium salt and the organic solvent to be used are not limited in this invention. For example, as the electrolyte, $LiClO_4$, $LiAsF_6$, $LiBF_4$, $LiB(C_6H_5)_4$, $CH_3SO_3Li$, $CF_3SO_3Li$ or the like, or mixture thereof can be used. Also, as the organic solvent, polypropylene carbonate, ethylene carbonate, 1,2-dimethoxyethane, 1,2-diethoxyethane, γ-butyrolactone, tetrahydrofuran 1,3-dioxolane, 4-methy-1,3-dioxolane, diethyl ether, sulfolane, methylsulfolane, acetonitrile, propionitrile or the like, or mixture of two kinds or more thereof can be used.

In the forgoing, the cases where the present invention was applied to the vehicle-mounting type cylindrical lithium secondary battery were explained, however, the present invention is not limited to these embodiments. It will be obvious to those skilled in the art that other various lithium secondary batteries may be made without departing from the scope of the invention as hereinafter claimed.

What is claimed is:

1. A lithium secondary battery, comprising:
   a positive electrode having a positive electrode collector to which mixture containing lithium manganate as positive electrode active material is applied, wherein a Li/Mn ratio in the lithium manganate is in a range of from 0.55 or more to 0.6 or less; and
   a negative electrode having a negative electrode collector to which mixture containing amorphous carbon material as negative electrode active material is applied, wherein irreversible capacity of the amorphous carbon material is in a range of 5% or more and 25% or less of initial charge capacity, and a discharge capacity ratio (−/+) of the negative electrode to the positive electrode after the initial charge is set in a range of 1.3 or more and 1.8 or less by making the amount of the amorphous carbon material excessive.

2. A lithium secondary battery according to claim 1, wherein a mean particle diameter of the amorphous carbon material is 10 μm or less.

3. A lithium secondary battery according to claim 1, wherein a mean particle diameter of the amorphous carbon material is 3.5 μm or more.

4. A lithium secondary battery according to claim 1, wherein a specific surface area of the amorphous carbon material is in a range of 5 $m^2$/g to 20 $m^2$/g.

* * * * *